(12) United States Patent
Wang et al.

(10) Patent No.: US 12,512,501 B2
(45) Date of Patent: Dec. 30, 2025

(54) MODULE PRESSURIZATION DEVICE AND PRESSURIZATION METHOD THEREFOR

(71) Applicant: CONTEMPORARY AMPEREX TECHNOLOGY CO., LIMITED, Ningde (CN)

(72) Inventors: Jifeng Wang, Ningde (CN); Guoxi Bai, Ningde (CN); Anwei Jing, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/233,905

(22) Filed: Jun. 10, 2025

(65) Prior Publication Data

US 2025/0309322 A1 Oct. 2, 2025

Related U.S. Application Data

(63) Continuation of application No. PCT/CN2024/093764, filed on May 16, 2024.

(30) Foreign Application Priority Data

Jan. 29, 2024 (CN) .......................... 202410115172.7

(51) Int. Cl.
*B30B 15/26* (2006.01)
*H01M 10/04* (2006.01)

(52) U.S. Cl.
CPC ......... *H01M 10/0404* (2013.01); *B30B 15/26* (2013.01); *H01M 10/0481* (2013.01)

(58) Field of Classification Search
CPC .......... B30B 7/04; B30B 15/26; H01M 10/04; H01M 10/0404; H01M 10/0468;
(Continued)

(56) References Cited

FOREIGN PATENT DOCUMENTS

CN 216720013 U 6/2022
CN 115312828 A 11/2022
(Continued)

OTHER PUBLICATIONS

English translation of CN-117325496 A—13 pages, retrieved in Oct. 2025. (Year: 2025).*

(Continued)

*Primary Examiner* — Jimmy T Nguyen
(74) *Attorney, Agent, or Firm* — ANOVA LAW GROUP, PLLC

(57) ABSTRACT

A module pressurization device includes a conveying line, a pressurization apparatus, and a control apparatus. The conveying line passes through a pressurization station and is configured to convey a battery module. The pressurization apparatus is arranged corresponding to the pressurization station and includes a jacking and supporting mechanism and a pressurization mechanism which are opposite in a first direction. The jacking and supporting mechanism is provided with a plurality of jacking and supporting portions configured to move in the first direction, arranged in a second direction, and configured to jack and support the heat dissipation plate. The pressurization mechanism is configured to compress the battery module. The control apparatus is electrically connected to the jacking and supporting mechanism and the pressurization mechanism so as to control the jacking and supporting mechanism and the pressurization mechanism to act.

20 Claims, 8 Drawing Sheets

(58) Field of Classification Search
CPC . H01M 10/0481; H01M 50/204; Y02E 60/10; Y02P 70/50
See application file for complete search history.

(56) References Cited

FOREIGN PATENT DOCUMENTS

| | | | | |
|---|---|---|---|---|
| CN | 115602905 A | 1/2023 | | |
| CN | 115986288 A | 4/2023 | | |
| CN | 220004751 U | 11/2023 | | |
| CN | 117325496 A * | 1/2024 | ............... | B30B 9/00 |
| CN | 117404878 A * | 1/2024 | ................ | F26B 9/06 |
| CN | 117650267 A | 3/2024 | | |
| JP | 2001068885 A | 3/2001 | | |
| KR | 20240001828 A * | 1/2024 | ........ | H01M 10/0404 |
| WO | 2022021891 A1 | 2/2022 | | |

OTHER PUBLICATIONS

The World Intellectual Property Organization (WIPO) International Search Report and Written Opinion for PCT/CN2024/093764 Sep. 27, 2024 14 Pages (including translation).
State Intellectual Property Office of China The First Office Action for Application No. 202410115172.7 Mar. 08, 2024 24 pages (including translation).
State Intellectual Property Office of China Notice of Grant of Patent Right for Invention for Application No. 202410115172.7 Apr. 3, 2024 8 pages (including translation).

\* cited by examiner

MODULE PRESSURIZATION DEVICE AND PRESSURIZATION METHOD THEREFOR

CROSS-REFERENCE TO RELATED APPLICATIONS

The present application is a continuation of International Application No. PCT/CN2024/093764, filed on May 16, 2024, which claims priority to Chinese Patent Application No. 202410115172.7, entitled "MODULE PRESSURIZATION DEVICE AND PRESSURIZATION METHOD THEREFOR" filed with the Chinese Patent Office on Jan. 29, 2024, the entire contents of both of which are incorporated herein by reference.

TECHNICAL FIELD

The present application relates to the technical field of pressurization and standing of battery module, and particularly relates to a module pressurization device and a pressurization method therefor.

BACKGROUND

A power battery generally includes a battery module and a water-cooled plate, and the battery module in use is cooled by means of the water-cooled plate; in a production process of the power battery, it is generally needed to perform a process of mounting the water-cooled plate, and in this process, it is needed to coat heat-conducting glue between the water-cooled plate and the battery module to improve the thermal conductivity of the water-cooled plate. However, in related technology, the heat-conducting glue is prone to the problem of uneven coating, resulting in poor heat dissipation performance of the power battery produced.

SUMMARY

A main objective of the present application is to provide a module pressurization device and a pressurization method therefor to relieve a situation that a heat-conducting glue is unevenly coated in a production process of a power battery, resulting in poor heat dissipation performance of the power battery.

In a first aspect, the present application provides a module pressurization device, and the module pressurization device is provided with a pressurization station for carrying out pressure maintaining on a battery module of which the bottom is adhered with a heat dissipation plate; and the module pressurization device includes:

a conveying line which passes through the pressurization station and is configured to convey the battery module;
a pressurization apparatus arranged corresponding to the pressurization station, the pressurization apparatus including a jacking and supporting mechanism and a pressurization mechanism which are opposite in a first direction, in which, the jacking and supporting mechanism is provided with a plurality of jacking and supporting portions which can move in the first direction, the plurality of jacking and supporting portions are arranged in a second direction and are configured to jack and support the heat dissipation plate so as to separate the battery module from the conveying line, and the pressurization mechanism is configured to compress the battery module; and
a control apparatus which is electrically connected to the jacking and supporting mechanism and the pressurization mechanism so as to control the jacking and supporting mechanism and the pressurization mechanism to act.

In the technical solution of this embodiment of the present application, the battery module adhered with the heat dissipation plate in an upstream process can be automatically conveyed to the pressurization station through the conveying line, so the transfer efficiency is high; on the pressurization station, the jacking and supporting mechanism is controlled by the control apparatus to jack and support the heat dissipation plate from the bottom by means of the plurality of jacking and supporting portions, thereby separating the battery module from the conveying line; in this process, the plurality of jacking and supporting portions are arranged in the second direction and can apply a supporting force from each position of the heat dissipation plate, so that the heat dissipation plate can be effectively prevented from deformation caused by lack of local supporting in the pressurization process, and the excellent rate of the battery module is improved; then, the pressurization mechanism is controlled to pressurize the battery module from the top, thus the heat-conducting glue coated between the heat dissipation plate and the battery module can be uniformly pressed and spread with pressure, the situation that the heat-conducting glue is not uniformly coated is relieved, and the heat dissipation capacity of the battery module can be improved; and moreover, because the battery module is jacked and supported to be separated from the conveying line by the jacking and supporting mechanism, in the pressurization process of the pressurization mechanism, the pressure is transmitted to the jacking and supporting mechanism through the battery module, the conveying line is prevented from being pressed, and stable operation of the conveying line is guaranteed.

In some embodiments, the pressurization mechanism includes a plurality of pressurization assemblies, and each pressurization assembly is arranged corresponding to at least one row of battery cells of the battery module; and each pressurization assembly includes:

a driving structure which is provided with a driving portion that can move in the first direction; and
a pressing plate structure which is arranged on the driving portion and configured to compress to reach the at least one row of battery cells when the driving portion moves towards the jacking and supporting mechanism; and
the control apparatus is electrically connected to a plurality of driving structures.

According to the above technical means, the pressurization mechanism includes the plurality of pressurization assemblies, and each pressurization assembly corresponds to the at least one row of battery cells; and each driving portion driven by related driving structure can drive the corresponding pressing plate structure to compress the corresponding at least one row of battery cells, thus a plurality of rows of battery cells can be independently driven and pressurized by different driving structures, the pressurization force is locally controllable, the pressure on each position on the battery module is uniform, namely, each position of the heat-conducting glue between the battery module and the heat dissipation plate can be uniformly pressed, and the excellent rate of a product is improved.

In some embodiments, in a moving stroke of the driving portion, the pressing plate structures can perform compressing to reach two rows of battery cell modules in the battery module.

According to the above technical means, one pressing plate structure can correspondingly perform compressing on the two rows of battery cell modules; for the battery modules of most specifications, the pressurization operation can be completed by four rows of pressurization assemblies, the number is relatively reasonably set, the arranged driving structures are relatively compact, and the production cost of the device is also controlled on the premise of realizing local independent pressurization.

In some embodiments, the driving structures include a plurality of cylinders which are arranged in the length direction of the pressing plate structures, and piston rods of the cylinders are connected to the pressing plate structures; and the driving portions include the piston rods.

According to above technical means, the cylinders are simple in principle and structure, easy to mount and maintain, and have low requirement for a user, and moreover, the purchase cost of the cylinders is low; the plurality of cylinders are arranged in the length direction of the pressing plate structures so that it can be guaranteed that all parts of the pressing plate structures can uniformly bear the driving force, which is conductive to the maintaining of the rigidity of the pressing plate structures, the plurality of battery cells in the same row can bear the same pressure, namely, the battery module is uniformly pressed.

In some embodiments, the pressing plate structures include insulated pressing plates, and the insulated pressing plates are configured to compress the battery cells.

According to the above technical means, the insulated pressing plates can keep an insulating state between two terminal posts of the battery cells when compressing the battery cells, thereby preventing the battery cells from being damaged due to short circuit, improving the safety in the pressurization process.

In some embodiments, the pressing plate structures further include connecting plates which are arranged on the driving portions, and the insulated pressing plates are detachably arranged on the connecting plates.

According to the above technical means, the insulated pressing plates and the connecting plates are arranged to be in a detachable form, which facilitates replacement, and is conductive to the improvement of the maintenance efficiency.

In some embodiments, a plurality of compressing protrusions are formed on the insulated pressing plates and configured to perform compressing to reach a plurality of terminal posts of the at least one row of battery cells.

According to the above technical means, because the terminal posts of the battery cells are located on two sides of battery cell top covers in the length direction, large pressurization force can be borne; the plurality of compressing protrusions are arranged corresponding to the terminal posts of the battery cells, the terminal posts can bear pressure in the pressurization process, and other components on battery cell housings can be prevented from being deformed or damaged due to pressure bearing; and moreover, due to the protruding of the compressing protrusions, the terminal posts can make contact firstly in the downward pressing process by the pressing plate structures, and therefore explosion-proof valves and temperature-sensing harnesses on the battery cell top covers can be prevented from being extruded and damaged by the pressing plate structures.

In some embodiments, the module pressurization device further includes a fool-proof structure, and the fool-proof structure includes:

two matching portions, one being arranged on the pressing plate structures while the other one being fixed relative to the position of the pressurization station, in which, the two matching portions can be oppositely arranged within the moving stroke of the pressing plate structures away from the jacking and supporting mechanism; and a connecting portion which is configured to connect the two matching portions when the two matching portions are oppositely arranged so as to limit the pressing plate structures to move towards the jacking and supporting mechanism.

According to the above technical means, when the two matching portions are located at the opposite positions, the pressing plate structures are at positions away from the jacking and supporting mechanism, at the moment, the pressurization process is not started, if it is needed to overhaul the device, the two matching portions can be connected by means of the connecting portion, and therefore, the pressing plate structures can be locked at the current positions, the device is difficult to enter a working state, maintenance personnel can be prevented from personal injury by the device accidentally started in the overhauling process, and the production safety of the device is improved.

In some embodiments, the fool-proof structure further includes:

a placement portion which is fixed relative to the position of the pressurization station, the connecting portion being able to be selectively placed on the placement portion; and an in-place detection apparatus which is arranged corresponding to the placement portion and is electrically connected to the control apparatus to generate a warning signal after the connecting portion is detected.

According to the above technical means, when the connecting portion is placed on the placement portion, there is no connection between the two matching portions, the pressing plate structures can be driven by the driving structures to work, and the device can enter the working state at the moment; and the in-place detection apparatus can generate the warning signal after detecting the existence of the connecting portion so as to remind the overhaul personal to pay attention to safety; and when the connecting portion is not placed on the placement portion, the in-place detection apparatus cannot detect the existence of the connecting portion, the warning signal cannot be generated, the device is in a locked safety state at the moment, and the overhaul personal can overhaul the device.

In some embodiments, the module pressurization device includes a fixing portion, and the fixing portion is fixed relative to the position of the pressurization station;

limiting portions are arranged on the pressing plate structures and are opposite to the fixing portion in the first direction; and the limiting portions can prop against the fixing portion when the pressing plate structures move to a position in which the at least one row of battery cells can be compressed.

According to the above technical means, the limiting portions are arranged on the pressing plate structures, and the limiting portions can prop against the fixing portion when the pressing plate structures move to the position in which the battery cells can be compressed in the first direction, so that the pressing plate structures are limited to continuously press the battery cells with excessive stroke, the battery cells can be prevented from being excessively compressed, the safety of the battery cells is ensured, and the economic loss is reduced; and moreover, by forced limitation of the limiting portions, the repeated downward pressing accuracy of the pressing plate structures also can be ensured, and the quality stability of battery module products in the same batch is ensured.

In some embodiments, shaft sleeves are arranged on the fixing portion and are provided with holes in the first direction; and guide shafts are arranged on the pressing plate structures and extend in the first direction, and the guide shafts penetrate through the shaft sleeves; mounting structures are formed at tail ends of the guide shafts deviating from the pressing plate structures; and the limiting portions are arranged on the mounting structures.

According to the above technical means, the shaft sleeves can play a role in guiding the guide shafts, namely, a role in guiding the pressing plate structures, thereby ensuring that the pressing plate structures can accurately compress the battery module; moreover, according to the solution, the mounting structures on the guide shafts are fully utilized as mounting foundations of the limiting portions, the structure is simple; and when the limiting portions abut against the fixing portion, the resulted reverse acting force can directly act on the guide shafts in an axial direction, thus the radial load of the guide shafts acting on the shaft sleeves is reduced, and the service lives of the guide shafts and the shaft sleeves are prolonged.

In some embodiments, the limiting portions include limiting bolts which are connected to the pressing plate structure by means of thread pairs; and in the screwing stroke of the limiting bolts, the positions of the limiting bolts in the first direction are adjustable.

According to the above technical means, the characteristic that the limiting bolts can be adjusted in a stepless mode is utilized, so the moving stroke of the pressing plate structures can be accurately adjusted, adaptive adjustment can be performed according to the battery modules of different specifications, thus the application range of the device is widened, more accurate compressing force can be applied to the battery module, and the excellent rate of the battery module is increased.

In some embodiments, the pressing plate structures are further provided with sensing portions;

the module pressurization device further includes two arriving detection apparatuses which are arranged at an intervals in the first direction, and the two arriving detection apparatuses are electrically connected to the control apparatus; and in the moving stroke of the pressing plate structures, the sensing portions can sequentially arrive at the positions of the two arriving detection apparatuses, and the arriving detection apparatuses are configured to identify the sensing portions and feed back arriving signals to the control apparatus.

According to the above technical means, in the moving process of the pressing plate structures, the sensing portions can move together, the two arriving detection apparatuses serving as sensing elements are fixedly arranged and located at two ends of the stroke of the pressing plate structures to sense the positions of the sensing portions, thus the positions of the pressing plate structures can be reflected, furthermore, the current state of the pressing plate structures can be fed back to a system, then the system can conveniently make corresponding control over the driving structures to reduce ineffective energy consumption, for example, when one pressing plate structure is located at the position in which the battery module can be compressed, the corresponding arriving detection apparatus can feed back a downward pressing arriving signal, and then the control apparatus can control the corresponding driving structure to stop driving.

In some embodiments, a tray configured to convey the battery module is arranged on the conveying line, the tray includes a bottom end and a top end which are opposite in the first direction, and a plurality of avoiding channels for communicating the bottom end with the top end, and the battery module can be replaced on the top end; and when the tray is located at the pressurization station, the jacking and supporting portions can jack and support the battery module through the corresponding avoiding channels within the moving stroke.

According to the above technical means, the battery module is loaded by the tray to be transferred on the conveying line, so that the battery module is prevented from being collided and damaged due to direct contact with the conveying line; and when the tray loading the battery module is conveyed to the pressurization station, the jacking and supporting portions can make contact with the battery module located at the top end of the tray by the avoiding channels in the tray, and therefore the battery module can be jacked and supported so as to be smoothly separated from the tray, and the tray and the conveying line are prevented from being pressed.

In some embodiments, a movable blocking structure is further arranged on the conveying line, which can block the battery module at the pressurization station.

According to the above technical means, the movable blocking structure can move on the conveying line so as to have two positions of extending out of and retracting back to the conveying line; and when extending out of the conveying line, the movable blocking structure can play a blocking role on the battery module to block the battery module at the pressurization station, thus facilitating subsequent pressurization, and improving the production efficiency.

In some embodiments, the module pressurization device further includes an anti-deviation detection apparatus which is configured to detect the position of the battery module after the jacking and supporting mechanism acts so as to generate a corresponding detection signal; and the control apparatus is electrically connected to the anti-deviation detection apparatus so as to control the pressurization mechanism to act when the detection signal is a normal signal.

According to the above technical means, the anti-deviation detection apparatus can detect the position of the battery module after the jacking and supporting mechanism acts; only the detection signal fed back after the position of the battery module is ensured to be accurate is the normal signal, the control apparatus can control the pressurization mechanism to follow up the action so as to complete pressurization; when the position of the battery module deviates, and the detection signal fed back by the anti-deviation detection apparatus is an abnormal signal, the control apparatus will control the pressurization mechanism to stop acting, and meanwhile warns an operator to adjust the battery module in time, or control other adjusting mechanisms to adjust the battery module until the position of the battery module is recovered to be accurate, and therefore the production loss caused by a fact that the battery module is not in place can be avoided.

In a second aspect, the present application provides a pressurization method for a module pressurization device; the module pressurization device is provided with a pressurization station for carrying out pressure maintaining on a battery module of which the bottom is adhered with a heat dissipation plate; the module pressurization device includes a jacking and supporting mechanism, a pressurization mechanism and a conveying line;

the pressurization method includes:
  a step of entering station: controlling the conveying line to work to convey the battery module to the pressurization station;
  a step of jacking: controlling the jacking and supporting mechanism to work to support the heat dissipation plate from the bottom; and
  a step of maintaining pressure: controlling the pressurization mechanism to work to pressurize the battery module from the top and maintaining the pressure to a target time length.

In the technical solution of this embodiment of the present application, due to the automatic conveying by the conveying line, the battery module transferring efficiency can be improved, and the production efficiency of a battery pack production line is improved; then the battery module can be jacked and supported to be separated from the conveying line by means of the jacking and supporting mechanism, so that the conveying line is prevented from bearing the pressurization force; and under the cooperation of the pressurization mechanism, heat-conducting glue between the battery module and the heat dissipation plate can be fully extruded and uniformly spread, thus the heat-conducting glue coats each local position on a heating surface of the battery module, and the heat dissipation efficiency of the battery module is improved.

In some embodiments, the pressurization mechanism includes a plurality of pressurization assemblies, and each pressurization assembly includes a driving structure and a pressing plate structure; and
  the step of maintaining pressure includes:
  respectively controlling a plurality of driving structures to act to respectively drive a plurality of pressing plate structures to pressurize a plurality of rows of battery cells of the battery module, and maintaining the pressure to the target time length.

According to the above technical means, the plurality of driving structures can be driven and controlled respectively, so that local pressurization force is controllable, pressure on each position of the battery module is uniform, that is, it is ensured that each position of the heat-conducting glue between the battery module and the heat dissipation plate is uniformly pressed, and moreover, the pressure is maintained to the target time length to prevent the heat-conducting glue from retracting, the heat-conducting glue can be kept in a state of being in close contact with the heat dissipation plate and the battery module, and therefore, the heat dissipation efficiency of the battery module is improved.

In some embodiments, the module pressurization device further includes an anti-deviation detection apparatus configured to detect the position of the battery module after the jacking and supporting mechanism acts and feed back a corresponding detection signal to the control apparatus; and
  the step of maintaining pressure includes:
  after the heat dissipation plate is supported, and when the received detection signal fed back by the anti-deviation detection apparatus is a normal signal, controlling the pressurization mechanism to pressurize the battery module from the top, and maintaining the pressure to the target time length.

According to the above technical means, the anti-deviation detection apparatus is arranged to sense the position state of the battery module, so that when the battery module is located at an accurate position, and the detection signal fed back by the anti-deviation detection apparatus is the normal signal, the control apparatus can control the pressurization mechanism to accurately pressurize the battery module, thus ensuring the pressurization quality; and when the battery module is located at an inaccurate position, and the detection signal fed back by the anti-deviation detection apparatus is an abnormal model, the control apparatus can control the pressurization mechanism to stop downward pressing, so that an operator can adjust the position of the battery module or other adjusting devices can be used for adjusting the position of the battery module to ensure the pressurization quality.

In some embodiments, the conveying line is configured to convey the battery module by a tray, and the module pressurization device further includes a tray positioning apparatus; and
  after the step of entering station, the pressurization method further includes:
  a step of positioning: controlling the tray positioning apparatus to work to position the tray.

According to the above technical means, an incoming tray is positioned at the pressurization station by the tray positioning apparatus, and thus the battery module can be accurately positioned at the pressurization station to be accurately aligned with the pressurization mechanism, the pressurization precision is ensured, and the excellent rate of products is improved.

In some embodiments, after the step of maintaining pressure, the pressurization method further includes:
  a step of releasing pressure: controlling the pressurization mechanism to lift so as to separate the battery module; and
  a step of falling back: controlling the jacking and supporting mechanism to fall back so as to separate the heat dissipation plate.

According to the above technical means, after the step of maintaining pressure, the pressurization and pressure maintaining operations on the battery module and the heat dissipation plate are completed; at the moment, by the step of releasing pressure, the pressurization mechanism can be returned to an initial position so as to separate the battery module; moreover, by the step of falling back, the jacking and supporting mechanism can be returned to the initial position so as to separate the heat dissipation plate; at the moment, the battery module can be returned to the conveying line again, and the battery module can be conveyed to a next station by the conveying line; and after that, the module pressurization device can be recovered to an idle state again, and the conveying line can convey a next battery module to the pressurization station in time, thus uninterrupted pressurization operation by the module pressurization device on the battery module is realized, and the production efficiency is guaranteed.

In some embodiments, a movable blocking structure is further arranged on the conveying line of the module pressurization device;
  the step of entering station includes:
  controlling the movable blocking structure to lift, and controlling the conveying line to work to convey battery module to the pressurization station until the battery module is blocked by the movable blocking structure; and
  correspondingly, after the step of falling back, the pressurization method further includes a step of exiting station, which includes:

controlling the movable blocking structure to fall back, and controlling the conveying line to work to convey the battery module to the next station.

According to the technical means, the movable blocking structure is arranged on the conveying line and can extend out of and retract back to the conveying line within the moving stroke so as to block the battery module at the pressurization station, thus the battery module can be preliminarily positioned, which facilitates the pressurization apparatus to follow up to pressurization and pressure maintaining operations on the battery module; and moreover, the pressurized battery module can be released in time, so that the pressurization efficiency of the module pressurization device is improved.

In some embodiments, the pressurization mechanism includes driving structures and pressing plate structures, the module pressurization device further includes two arriving detection apparatuses, and the two arriving detection apparatuses are configured to fed back arriving signals of the pressing plate structure at the corresponding positions respectively;

the step of maintaining pressure includes:
controlling the driving structures to act to drive the pressing plate structures to move towards the jacking and supporting mechanism; and
after the arriving signal fed back by one of the corresponding arriving detection apparatuses is received, controlling the corresponding driving structure to stop acting, and maintaining to the target time length; and
correspondingly, the step of falling back includes:
controlling the jacking and supporting mechanism to fall back after the arriving signal fed back by the other corresponding arriving detection apparatus is received.

According to the above technical means, in the moving process of the pressing plate structures, the position state of the pressing plate structures can be detected by means of the two arriving detection apparatuses, and then the current state of the pressing plate structures is fed back to the control apparatus; in the process that the pressing plate structures move towards the jacking and supporting mechanism, if the compressing is performed to reach the position of the battery module, the corresponding arriving detection apparatus can detect the position state in time, and the control apparatus will control the corresponding driving structure to stop working in time, so that the battery module can be prevented from being excessively compressed from the source, and invalid energy consumption of the driving structures can be reduced; and if the corresponding arriving detection apparatus is triggered in the process that the corresponding pressing plate structure is lifted away from the jacking and supporting mechanism, the pressurization mechanism returns to the initial position, then the jacking and supporting mechanism can be controlled to fall back in a following mode, thus initialization of the module pressurization device is achieved, and pressurization operation can be conveniently carried out on the next battery module.

The above description is only an overview of the technical solution of the present application, and in order to be able to understand more clearly the technical means of the present application, it can be implemented in accordance with the contents of the description, and in order to make the above and other purposes, characteristics and advantages of the present application more obvious and easy to understand, the specific embodiments of the present application are listed below.

DESCRIPTION OF THE DRAWINGS

In order to provide a clearer explanation of the embodiments of the present application, a brief introduction will be given to the accompanying drawings required in the description of the embodiments. Obviously, the accompanying drawings in the following description are only some embodiments of the present application. For ordinary technical personnel in the art, other accompanying drawings can be obtained based on structures shown in these drawings without any creative effort.

DESCRIPTION OF REFERENCE NUMERALS

Figure 1:
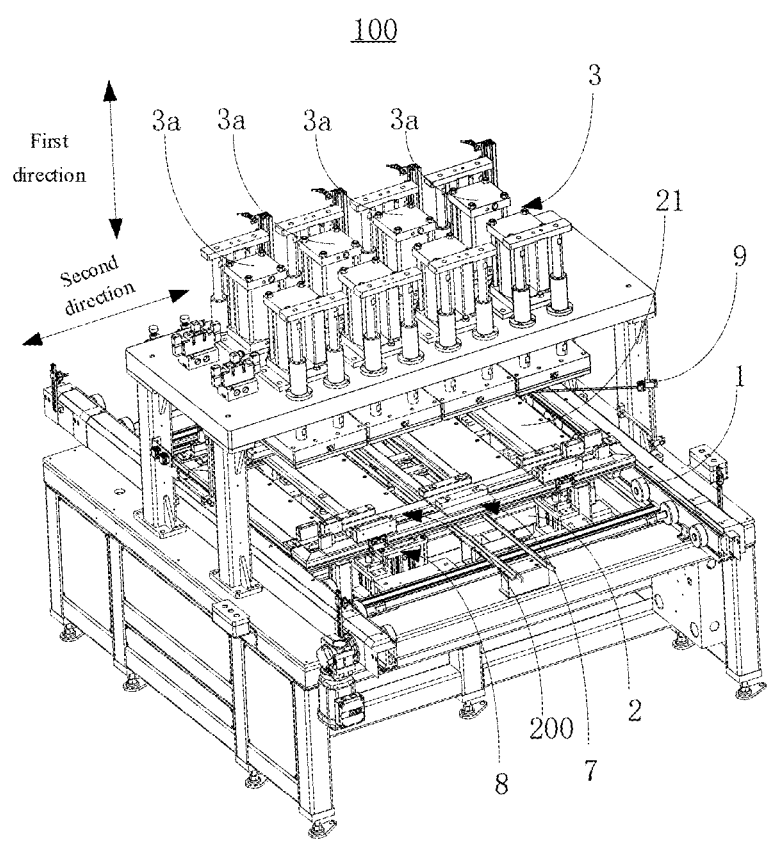
FIG. 1 is a structural schematic diagram of an Embodiment 1 of a module pressurization device provided by the present application.

| Reference numerals | Name | Reference numerals | Name |
| --- | --- | --- | --- |
| 100 | Module pressurization device | 324a | Limiting bolt |
| 1 | Conveying line | 325 | Guide shaft |
| 2 | Jacking and supporting mechanism | 3251 | Mounting structure |
| 21 | Jacking and supporting portion | 4 | Fool-proof structure |
| 3 | Pressurization mechanism | 41 | Matching portion |
| 3a | Pressurization assembly | 42 | Connecting portion |
| 31 | Driving structure | 43 | In-place detection apparatus |
| 31a | Cylinder | 44 | Placement portion |
| 311 | Driving portion | 5 | Fixing portion |
| 311a | Piston rod | 51 | Shaft sleeve |
| 32 | Pressing plate structure | 6 | Arriving detection position |
| 321 | Connecting plate | 7 | Movable blocking structure |
| 322 | Insulated pressing plate | 8 | Tray positioning apparatus |
| 3221 | Compressing protrusion | 9 | Anti-deviation detection apparatus |
| 323 | Sensing portion | 200 | Tray |
| 324 | Limiting portion | 210 | Avoiding channel |

The achievement of the objective of the present application, the functional characteristics and the advantages will be further explained with reference to the accompanying drawings in conjunction with the embodiments.

DETAILED DESCRIPTION OF EMBODIMENTS

Embodiments in technical solutions of the present application will be described in detail below in conjunction with the accompanying drawings. The following embodiments are only used to more clearly illustrate the technical solution of the present application, and therefore are only used as examples and cannot be used to limit the scope of protection of the present application.

Unless otherwise defined, all technical and scientific terms used herein have the same meanings as those commonly understood by those skilled in the art to which the present application pertains to. the terms used herein are for the purpose of describing specific embodiments only, and are not intended to limit the present application. The terms "including" and "having" and any variations thereof in the description and claims of the present application and the aforementioned description of the drawings are intended to cover non-exclusive inclusion.

In the description of the embodiments of the present application, the technical terms "first," "second," and the like are used only to distinguish between different objects, and are not to be understood as indicating or implying a relative importance or implicitly specifying the number, particular order, or primary and secondary relation of the technical features indicated. In the description of the embodiments of the present application, the meaning of "a plurality of" is two or more, unless otherwise explicitly and specifically defined.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is simply a description of an association of associated objects, which indicates that there may exist three relationships, for example, A and/or B may represent three situations: A exists alone, both A and B exist, and B exists alone. Moreover, the character "/" herein generally indicates that the context objects are in an "or" relationship.

In the descriptions of the embodiments of the present application, the term "a plurality of" refers to more than two (including two), and similarly, "a plurality of groups" refers to more than two groups (including two groups); and "a plurality of sheets" refers to more than two sheets (including two sheets).

In the description of the embodiments of the present application, the orientation or positional relationships indicated by the technical terms "center," "longitudinal," "transverse," "length," "width," "thickness," "upper," "lower," "front," "back," "left," "right," "vertical," "horizontal," "top," "bottom," "inner," "outer," "clockwise," "counter-clockwise," "axial," "radial," "circumferential," etc. are based on the orientation or positional relationships shown in the accompanying drawings, and are only for convenience of description of the present application and simplification of the description, rather than indicating or implying that the indicated device or element must have a specific orientation, be constructed and operate in a specific orientation, and therefore, cannot be understood as a limitation to the present application.

In the description of the embodiments of the present application, unless otherwise specified and limited, the technical terms "mounting," "connection," "connection" and "fixation" should be understood in a broad sense, for example, they can be fixed connection, detachable connection, or integration; or they can be mechanical connection or electrical connection; or they can be direct connection, indirect connection through an intermediate medium, or communication of the interiors of two elements or the relationship of interaction between two elements. For those of ordinary skill in the art, the specific meaning of the above terms in the present application may be understood on a case-by-case basis.

Power batteries are not only used in energy storage power systems such as hydropower, thermal power, wind power and solar power stations, but also widely used in electric vehicles such as electric bicycles, electric motorcycles, and electric vehicles, as well as aerospace and other fields. With the continuous expansion of the application field of power battery, the demand for its market is also expanding, followed by the increasing demand for its product performance, and one of the more important performance is heat dissipation performance, which directly affects the service life of power battery.

The power battery generally includes a battery module and a water-cooled plate, and the battery module in use is cooled through the water-cooled plate, and in the production process of the power battery, it is generally needed to perform a mounting process of the water-cooled plate, in which, it is needed to coat heat-conducting glue between the water-cooled plate and the battery module to improve the thermal conductivity efficiency of the water-cooled plate. However, in related technology, the heat-conducting glue is prone to the problem of uneven coating, resulting in the problem of the lack of heat-conducting glue in the local position on the battery module, which directly leads to that in the working process of the power battery, heat cannot be timely transferred to the water-cooled plate due to the lack of heat-conducting glue on part of the battery module, consequently, the heat dissipation performance of the power battery produced is poor.

Based on the above, in order to relieve the poor heat dissipation performance of the power battery caused by uneven coating of the heat-conducting glue in the production process of the power battery, the present application provides a module pressurization device; a conveyor line is arranged and can transport a battery module to a pressurization station of the module pressurization device; a jacking and supporting mechanism and a pressurization mechanism are arranged at the pressurization station, the jacking and supporting mechanism is provided with a plurality of jacking and supporting portions which can move in a first direction, and the plurality of jacking and supporting portions are arranged in a second direction and configured to jack and support a heat dissipation plate; the heat dissipation plate can be jacked and supported by means of the plurality of jacking and supporting portions, thus the battery module can be jacked and supported to be separated from the conveying line; and then the battery module is pressurized by means of the pressurization mechanism, and the heat-conducting glue coated between the heat dissipation plate and the battery module can be uniformly pressed and spread with pressure, thereby relieving the poor heat dissipation performance of the battery module.

Each embodiment of the present application will be described in detail below in conjunction with the accompanying drawings.

Figure 2:
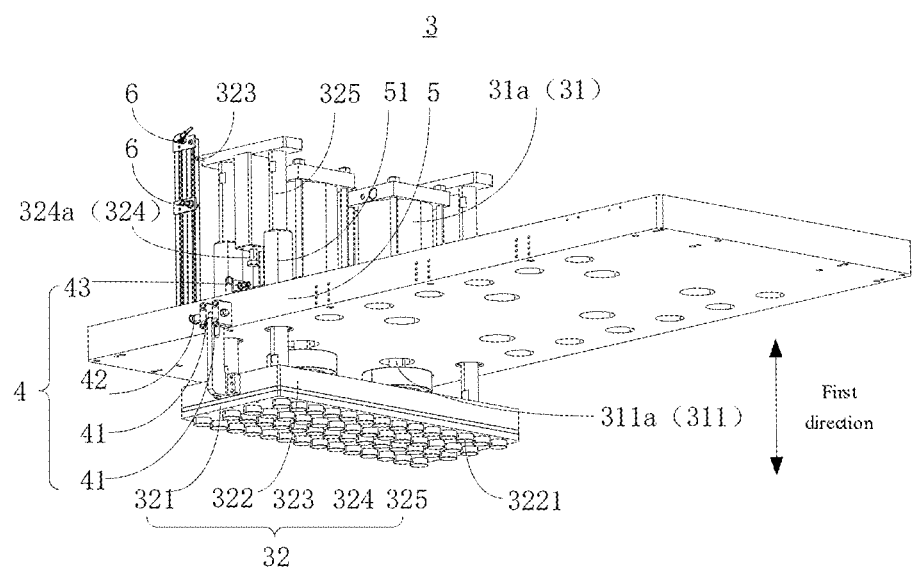
FIG. 2 is structural a schematic diagram of a pressurization mechanism in FIG. 1.
Figure 3:
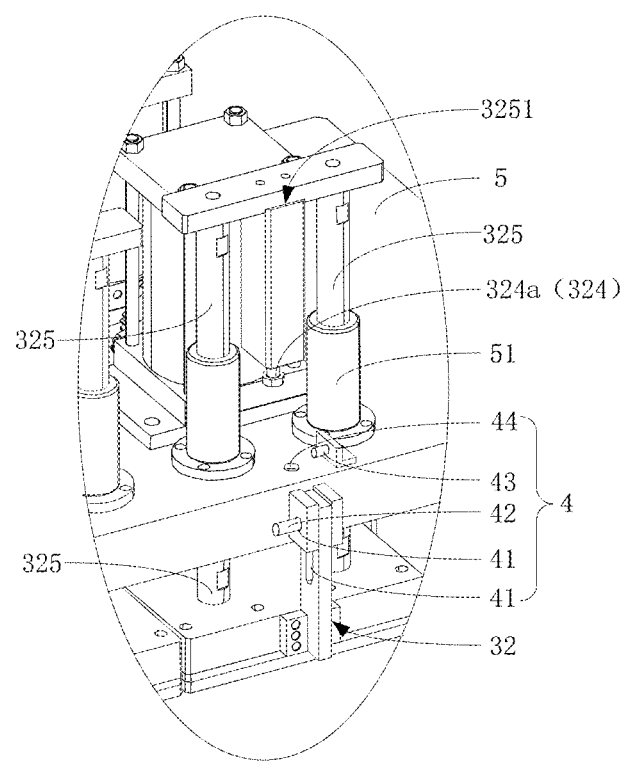
FIG. 3 is a local structural schematic diagram of a fool-proof structure and a pressurization mechanism in FIG. 2 from another angle of view.
Figure 4:
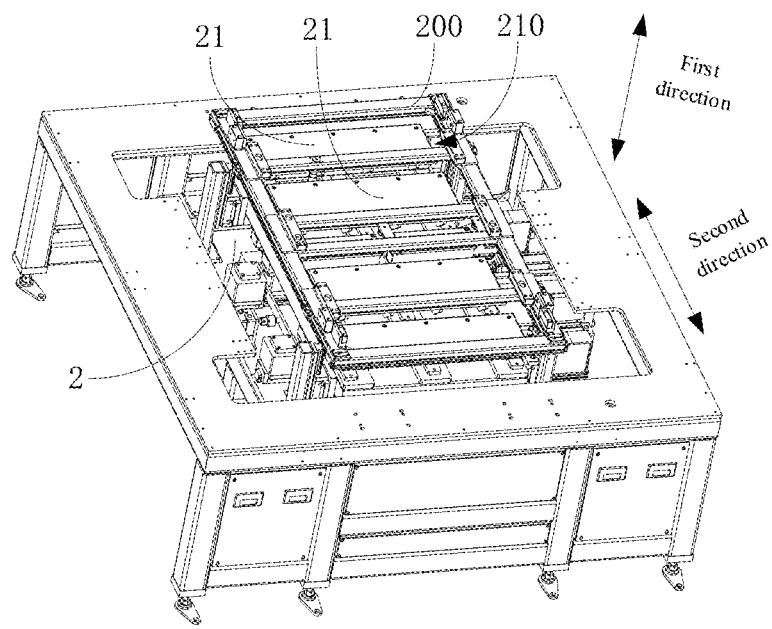
FIG. 4 is a structural schematic diagram of a jacking and supporting mechanism in FIG. 1 from another angle of view.

With reference to FIG. 1 in cooperation with FIG. 2 to FIG. 4, FIG. 1 is a structural schematic diagram of an Embodiment 1 of a module pressurization device 100 provided by the present application; FIG. 2 is structural a schematic diagram of a pressurization mechanism 3 in FIG. 1;

FIG. 3 is a local structural schematic diagram of a fool-proof structure and a pressurization mechanism in FIG. 2 from another angle of view; and FIG. 4 is a structural schematic diagram of a jacking and supporting mechanism in FIG. 1 from another angle of view. In some embodiments of the present application, the module pressurization device 100 is provided with the pressurization station for carrying out pressure maintaining on the battery module of which the bottom is adhered with the heat dissipation plate; the module pressurization device 100 includes a conveying line 1, a pressurization apparatus and a control apparatus; the conveying line 1 passes through the pressurization station and is configured to convey the battery module; the pressurization apparatus is arranged corresponding to the pressurization station and includes a jacking and supporting mechanism 2 and a pressurization mechanism 3 which are opposite in the first direction; the jacking and supporting mechanism 2 is provided with a plurality of jacking and supporting portions 21 which can move in the first direction; the plurality of jacking and supporting portions 21 are arranged in the second direction and are configured to jack and support the heat dissipation plate so as to separate the battery module from the conveying line 1; the pressurization mechanism 3 is configured to compress the battery module; and the control apparatus is electrically connected to the jacking and supporting mechanism 2 and the pressurization mechanism 3 so as to control the jacking and supporting mechanism 2 and the pressurization mechanism 3 to act.

It is to be noted that the battery module mentioned and the heat dissipation plate in this embodiment of the present application are adhered and molded through heat-conducting glue; the heat dissipation plate includes but is not limited to the water-cooled plate, can also include an oil-cooled plate and even an air-cooled plate, and its main effect is to absorb heat from the battery module through the heat-conducting glue and dissipated it to an external environment.

It is to be noted that the conveying line 1 is configured to convey the battery module on a production line, aiming to convey the battery module machined on an upstream station to the pressurization station, and meanwhile convey the battery modules pressurized at the pressurization station to a downstream station; the battery module can be of various types, for example, the conveying line 1 can be a belt conveying line 1, a roller shaft conveying line 1 or a speed chain conveying line 1, its specific structure is not limited in this embodiment; however, it is to be noted that the jacking and supporting mechanism 2 is needed to jack and support the battery module at the pressurization station so as to separate the battery module from the conveying line 1, so the conveying line 1 needs an avoiding space for the jacking and supporting mechanism 2 to pass through at the pressurization station, there are various specific implementation modes, for example, when the conveying line 1 is the speed chain conveying line 1, due to the structural convenience of the speed chain conveying line 1, enough avoiding space is reserved between speed chains on two sides, and when the conveying line 1 is the roller shaft conveying line 1, an enough interval is reserved between two adjacent roller shafts at the pressurization station to form the avoiding space; and moreover, the conveying line 1 can directly convey the battery module, or can also indirectly convey the battery module in mode of loading by a tray 200, which is not limited in this embodiment.

It is to be noted that there can be various arrangement positions of the jacking and supporting mechanism 2 and the pressurization mechanism 3, and the jacking and supporting mechanism 2 and the pressurization mechanism 3 can be arranged on the same basis or different bases as long as they can correspond to the pressurization station; because the jacking and supporting mechanism 2 and the pressurization mechanism 3 are opposite in the first direction and can act on the heat dissipation plate and the battery module from two sides of the top and the bottom correspondingly, it can be understood that the first direction is the thickness direction of the battery module; after the jacking and supporting mechanism 2 jacks and supports the battery module to be separated from the conveying line 1, the jacking and supporting mechanism 2 will bear the gravity of the whole battery module and the pressurization force applied to the battery module by the pressurization mechanism 3, and therefore, the jacking and supporting mechanism 2 is needed to be of a structure which is high in bearing capacity and can jack in the first direction, and there are various types of such structure, which is not limited in this embodiment; the pressurization mechanism 3 is configured to apply a pressurization force to the battery module, there are many types of structure, for example, it can be driven by cylinders to perform pressurization, or by a servo motor to perform pressurization, and its specific structure is not limited in this embodiment.

It is to be noted that the plurality of jacking and supporting portions 21 can be connected into a whole and move in a synchronous driving mode so as to guarantee synchronous supporting for the heat dissipation plate, but not limited thereto, the plurality of jacking and supporting portions 21 can be independently arranged and move in a distributed driving mode as long as ensuring stable supporting for the heat dissipation plate before the pressurization action of the pressurization mechanism 3, which is not limited in this embodiment; the jacking and supporting portions 21 can be directly driven by a driving source such as a pressure cylinder and the servo motor or indirectly driven by a guide structure, which is not limited in this embodiment; the second direction refers to a direction intersecting with the first direction, when the battery module of which the bottom is adhered with the heat dissipation plate is positioned in place, the second direction can be kept consistent with the width direction or the length direction of the heat dissipation plate, that is, the plurality of jacking and supporting portions 21 can be distributed in the length direction or the width direction of the heat dissipation plate.

It is to be noted that electric connection in this embodiment cannot be narrowly understood as only connection by a circuit structure, and wireless connection is available; the control apparatus can respectively control the jacking and supporting mechanism 2 and the pressurization mechanism 3 to act by an electric signal or a wireless signal and the like; moreover, it is to be understood that there is no inevitable sequential relationship for the control of the control apparatus to the jacking and supporting mechanism 2 and the pressurization mechanism 3, it is needed to be determined according to the moving strokes of the jacking and supporting mechanism 2 and the pressurization mechanism 3 as well as the moving speed of the jacking and supporting mechanism 2 and the pressurization mechanism 3 as long as it ensures that before the pressurization mechanism 3 acts on the battery module, the jacking and supporting mechanism 2 acts on the heat dissipation plate firstly, and thus the bearing effect can be achieved, and the conveying line 1 is prevented from bearing the pressurization force.

In the technical solution of this embodiment of the present application, the battery module adhered with the heat dissipation plate in an upstream process can be automatically conveyed to the pressurization station through the conveying line 1, so the transfer efficiency is high; on the pressurization station, the jacking and supporting mechanism 2 is controlled by the control apparatus to jack and support the heat dissipation plate from the bottom by means of the plurality of jacking and supporting portions 21, thereby separating the battery module from the conveying line 1; in this process, the plurality of jacking and supporting portions 21 are arranged in the second direction and can apply a supporting force from each position of the heat dissipation plate, so that the heat dissipation plate can be effectively prevented from deformation caused by lack of local supporting in the pressurization process, and the excellent rate of the battery module is improved; then, the pressurization mechanism 3 is controlled to pressurize the battery module from the top, thus the heat-conducting glue coated between the heat dissipation plate and the battery module can be uniformly pressed and spread with pressure, the situation that the heat-conducting glue is not uniformly coated is relieved, and the heat dissipation capacity of the battery module can be improved; and moreover, because the battery module is jacked and supported to be separated from the conveying line 1 by the jacking and supporting mechanism 2, in the pressurization process of the pressurization mechanism 3, the pressure is transmitted to the jacking and supporting mechanism 2 through the battery module, the conveying line 1 is prevented from being pressed, and stable operation of the conveying line 1 is guaranteed.

With reference to FIG. 1 and FIG. 2, in some embodiments, the pressurization mechanism 3 includes a plurality of pressurization assemblies 3a, each pressurization assembly 3a is arranged corresponding to at least one row of battery cells of the battery module; each pressurization assembly 3a includes a driving structure 31 and a pressing plate structure 32; the driving structures 31 are provided with driving portions 311 which can move in the first direction; the pressing plate structures 32 are arranged on the driving portions 311 and can perform compressing to reach the at least one row of battery cells when the driving portions 311 move towards the jacking and supporting mechanism 2; and the control apparatus is electrically connected to the plurality of driving structures 31.

It is to be noted that the battery module includes a plurality of rows of battery cells, the pressing plate structure 32 in each pressurization assembly 3a corresponds to at least one row of battery cells, namely, it is arranged only corresponding to one row of battery cells, or two rows of battery cells and even three rows of battery cells. In this embodiment, the rows of battery cells can be battery cells that are transversely arranged along the battery module and can also be battery cells longitudinally arranged along the battery module, at least a plurality of pressing plate structures 32 in the plurality of pressurization assemblies 3a are needed to correspond to the plurality of rows of battery cells of the battery module; there are various specific driving forms of the driving structures 31, which are not limited in this embodiment as long as a controllable driving portion 311 is provided and can move in the first direction; the pressing plate structures 32 can be in various shapes, but the size of the pressing plate structures 32 in the length direction of the whole row of battery cells is to be large so as to cover the whole row of battery cells.

According to the above embodiment, the pressurization mechanism 3 includes the plurality of pressurization assemblies 3a, and each pressurization assembly 3a corresponds to the at least one row of battery cells; and each driving portion 311 driven by related driving structure 31 can drive the corresponding pressing plate structure 32 to compress the corresponding at least one row of battery cells, thus a plurality of rows of battery cells can be independently driven and pressurized by different driving structures 31, the pressurization force is locally controllable, the pressure on each position on the battery module is uniform, namely, each position of the heat-conducting glue between the battery module and the heat dissipation plate can be uniformly pressed, and the excellent rate of a product is improved.

In some embodiments, within the moving stroke of the driving portions 311, the pressing plate structures 32 can perform compressing to reach two rows of battery cell modules in the battery module.

It is to be noted that the battery module is generally formed by arranging a plurality of sets of battery cell modules in rows, one set of battery cell modules is generally formed by arranging a plurality of single battery cells in rows, and for most battery modules, the battery module is generally formed by arranging eight rows of battery cell modules.

According to the above embodiment, one pressing plate structure 32 correspondingly compresses two rows of battery cell modules; for the battery modules of most specifications, pressurization operation can be completed through four rows of pressurization assemblies 3a, the number is reasonably set, the arranged driving structures 31 are compact, and the production cost of the device is controlled on the premise that local independent pressurization is achieved.

With reference to FIG. 2, in some embodiments, the driving structures 31 include a plurality of cylinders 31a arranged in the length direction of the plurality of pressing plate structures 32, and piston rods 311a of the cylinders 31a are connected to the pressing plate structures 32; the driving portions 311 include the piston rods 311a.

It is to be noted that the length direction of the pressing plate structures 32 corresponds to the arrangement direction of the whole row of battery cells; there can be two, three and even more cylinders 31a, and the number of the cylinders 31a is specifically determined according to the specification and the compressing force requirement of the battery module.

According to the above embodiment, the cylinders 31a are simple in principle and structure, easy to mount and maintain, and have low requirement for a user, and moreover, the purchase cost of the cylinders 31a is low; the plurality of cylinders 31a are arranged in the length direction of the pressing plate structures 32 so that it can be guaranteed that all parts of the pressing plate structures 32 can uniformly bear the driving force, which is conductive to the maintaining of the rigidity of the pressing plate structures 32, the plurality of battery cells in the same row can bear the same pressure, namely, the battery module is uniformly pressed.

With reference to FIG. 2, in some embodiments, the pressing plate structures 32 include insulated pressing plates 322, and the insulated pressing plates 322 are configured to compress the battery cells.

It is to be noted that the insulated pressing plates 322 refer to pressing plates with insulating property, which can be made of an inorganic insulating material, an organic material or a mixed insulating material; the inorganic insulating material is mica sheets, ceramics, marble, glass, sulfur and the like; the organic insulating material is rubber, resin, shellac, cotton yarn paper, hemp, silk, artificial silk tubes and the like; the mixed insulating material is an insulating material formed by mixing and processing the two insulating materials; the specific materials are not limited in this embodiment as long as the insulated pressing plates 322 have enough strength to apply pressure to the battery module, or the insulated pressing plates 322 can be supported enough to counteract the pressurization acting force between the insulated pressing plates 322 and the battery module.

According to the above embodiment, the insulated pressing plates 322 have insulating properties, which can keep an insulating state between two terminal posts of the battery cells when compressing the battery cells, thereby preventing the battery cells from being damaged due to short circuit, improving the safety in the pressurization process.

With reference to FIG. 2, in some embodiments, the pressing plate structures 32 further include connecting plates 321, the connecting plates 321 are arranged on the driving portions 311, and the insulated pressing plates 322 are detachably arranged on the connecting plates 321.

It is to be noted that the connecting plates 321 are arranged on the driving portions 311, and the insulated pressing plates 322 are detachably arranged on the connecting plates 321, it is to be understood that the connecting plates 321 serving as mounting foundations of the insulated pressing plates 322 need high strength, and because there is a partition formed by the insulated pressing plates 322 between the connecting plates 321 and the battery module, the connecting plates 321 can be made of a metal material or an alloy material with high strength; there are various detachable forms of the insulated pressing plates 322 and the connecting plates 321, for example, the detachable form can be implemented in a buckle connection mode or in a bolt connection mode, which is not limited in this embodiment.

According to the above embodiment, the insulated pressing plates 322 and the connecting plates 321 are arranged in a detachable mode, which facilitates replacement and is conductive to improvement of the maintenance efficiency.

With reference to FIG. 2, in some embodiments, a plurality of compressing protrusions 3221 are formed on the insulated pressing plates 322, and the compressing protrusions 3221 are configured to perform compressing to reach a plurality of terminal posts of the at least one row of battery cells respectively.

It is to be noted that the battery cells generally include battery cell housings, battery cell top covers and bare battery cells, the bare battery cells are arranged in the battery cell housings, and the battery cell top covers cover the battery cell housings so as to package the bare battery cells; explosion-proof valves, two battery cell terminal posts, temperature-sensing wire harnesses and other components are correspondingly arranged on the battery cell top covers, the two battery cell terminal posts are connected to cathodes and anodes of the bare battery cells respectively, and the two battery cell terminal posts are arranged at two ends of the battery cell top covers in the length direction respectively; and it is to be understood that the compressing protrusions 3221 are arranged to protrude out of main bodies of the insulated pressing plates 322 and can be in contact with the terminal posts of the battery cells firstly in the downward pressing process by the insulated pressing plates 322.

According to the above embodiment, because the terminal posts of the battery cells are located on two sides of battery cell top covers in the length direction, large pressurization force can be borne; the plurality of compressing protrusions 3221 are arranged corresponding to the terminal posts of the battery cells, the terminal posts can bear pressure in the pressurization process, and other components on battery cell housings can be prevented from being deformed or damaged due to pressure bearing; and moreover, due to the protruding of the compressing protrusions 3221, the terminal posts can make contact firstly in the downward pressing process by the pressing plate structures 32, and therefore the explosion-proof valves and the temperature-sensing harnesses on the battery cell top covers can be prevented from being extruded and damaged by the pressing plate structures 32.

With reference to FIG. 2 and FIG. 3, in some embodiments, the module pressurization device 100 further includes a fool-proof structure 4, the fool-proof structure 4 includes two matching portions 41 and a connecting portion 42, one of the two matching portions 41 is arranged on the pressing plate structures 32 while the other one is fixed relative to the position of the pressurization station, and the two matching portions 41 can be oppositely arranged within the moving stroke of the pressing plate structures 32 away from the jacking and supporting mechanism 2; and when the two matching portions 41 are oppositely arranged, the connecting portion 42 can connect the two matching portions 41 so as to limit the pressing plate structures 32 to move towards the jacking and supporting mechanism 2.

It is to be noted that in this embodiment of the present application, that one component is fixed relative to the position of the pressurization station refers to that in the same space, one point in the pressurization station is treated as a coordinate origin, the coordinates of the component relative to the coordinate origin is determined, and cannot change along with the change of the external environment; in this embodiment, the position of another matching portion 41 is fixed; that the two matching portions 41 can be oppositely arranged within the moving stroke of the pressing plate structures 32 away from the jacking and supporting mechanism 2 refers to that in the first direction, the matching portion 41 on the pressing plate structures 32 can move to the opposite position with the matching portion 41 fixed at another position in the process that the pressing plate structures 32 move away from the corresponding jacking and supporting mechanism 2; the opposite direction can be the first direction or the second direction different from the first direction; when the two matching portions 41 are opposite in the first direction, the connecting portion 42 can lock the two matching portions 41 in a hook lock mode, at the moment, the connecting portion 42 bears the tensile stress in the axial direction of the connecting portion 42; when the two matching portions 41 are opposite in the second direction, the connecting portion 42 can lock the two matching portions 41 in an inserted mode, at the moment, the connecting portion 42 bears the shearing force in the radial direction of the connecting portion 42, and the specific structure of the connecting portion 42 can be selected according to the specific locking mode of the connecting portion 42; and in some specific embodiments, the two matching portions 41 include two inserting holes extending in the second direction, the connecting portion 42 includes inserting pins which can be correspondingly inserted into the two inserting holes in the second direction, and therefore downward pressing of the pressing plate structure 32 is limited.

According to above embodiment, when the two matching portions 41 are located at the opposite positions, the pressing plate structures 32 are at positions away from the jacking and supporting mechanism 2, at the moment, the pressurization process is not started, if it is needed to overhaul the device, the two matching portions 41 can be connected by means of the connecting portion 42, and therefore, the pressing plate structures 32 can be locked at the current positions, the device is difficult to enter a working state, maintenance personnel can be prevented from personal injury by the device accidentally started in the overhauling process, and the production safety of the device is improved.

With reference to FIG. 2 and FIG. 3, in some embodiments, the fool-proof structure 4 further includes a placement portion 44 and an in-place detection apparatus 43, the placement portion 44 is fixed relative to the position of the pressurization station, and the connecting portion 42 can be selectively placed on the placement portion 44; and the in-place detection apparatus 43 is arranged corresponding to the placement portion 44, and is electrically connected to the control apparatus so as to generate a warning signal after the connecting portion 42 is detected.

It is to be noted that in FIG. 3, the connecting portion 42 is located at the position in which the two matching portions 41 can be connected, and at the moment, the placement portion 44 is in an empty state; the placement portion 44 is configured to place the connecting portion 42 at a corresponding position when it is not needed to connect the two matching portions 41 through the connecting portion 42; the in-place detection apparatus 43 is arranged corresponding to the placement portion 44 and is configured to detect the in-place condition of the connecting portion 42 at the position of the placement portion 44, feed back the warning signal to the control apparatus when the connecting portion 42 is detected and not feed back the warning signal when no connecting portion 42 is detected; after receiving the warning signal, the control apparatus can control a warning apparatus to give out a warning, in other words, the action of giving out the warning corresponds to the state of the connecting portion 42 on the placement portion 44 in a one-to-one manner, and thus the locking condition of the device can be embodied; generally, the connecting portion 42 only has two position states, that is, a state of connecting the two matching portions 41, and a state of being placed on the placement portion 44; in the connecting state, the pressing plate structure 32 is locked, and in the placing state, the pressing plate structure 32 is not locked; and the structure of the placement portion 44 is determined according to the connecting portion 42, and it is only needed to stably place the connecting portion 42 on the placement portion 44, for example, when the connecting portion 42 is an inserting pin, the placement portion 44 can be an mounting hole, and the inserting pin can be stably inserted and placed in the mounting hole.

According to the above embodiment, when the connecting portion 42 is placed on the placement portion 44, there is no connection between the two matching portions 41, the pressing plate structures 32 can be driven by the driving structures 31 to work, and the device can enter the working state at the moment; and the in-place detection apparatus 43 can generate the warning signal after detecting the existence of the connecting portion 42 so as to remind the overhaul personal to pay attention to safety; and when the connecting portion 42 is not placed on the placement portion 44 (the connecting portion 42 is at the position in which the two matching portions 41 can be connected), the in-place detection apparatus 43 cannot detect the existence of the connecting portion 42, the warning signal cannot be generated, the device is in a locked safety state at the moment, and the overhaul personal can overhaul the device.

With reference to FIG. 2 and FIG. 3, in some embodiments, the module pressurization device 100 includes a fixing portion 5 which is fixed relative to the position of the pressurization station; limiting portions 324 opposite to the fixing portion 5 in the first direction are arranged on the pressing plate structures 32; and when the pressing plate structures 32 move to the position for compressing at least one row of battery cells, the limiting portions 324 can abut against the fixing portion 5.

It is to be noted that the fixing portion 5 is fixed relative to the position of the pressurization station, which will not be listed herein; the limiting portions 324 are configured to limit the stroke of the pressing plate structures 32 after abutting against the fixing portion 5, there are various positions for the limiting portions 324 on the pressing plate structure 32, for example, the limiting portions 324 can be located on the side of the pressing plate structures 32 deviating from the jacking and supporting mechanism 2, or located on the side of the pressing plate structures 32 close to the jacking and supporting mechanism 2, or located on the sides of the pressing plate structures 32 as long as the limiting portions 324 are not located between the pressing plate structures 32 and the jacking and supporting mechanism 2 and right face the pressing plate structures 32; and moreover, in order to ensure the limiting accuracy, the limiting portions 324 and the fixing portion 5 are needed to be made of rigid materials to avoid losing the limiting effect due to deformation after contact.

According to the above embodiment, the limiting portions 324 are arranged on the pressing plate structures 32, and the limiting portions 324 can prop against the fixing portion 5 when the pressing plate structures 32 move to the position in which the battery cells can be compressed in the first direction, so that the pressing plate structures 32 are limited to continuously press the battery cells with excessive stroke, the battery cells can be prevented from being excessively compressed, the safety of the battery cells is ensured, and the economic loss is reduced; and moreover, by forced limitation of the limiting portions 324, the repeated downward pressing accuracy of the pressing plate structures 32 also can be ensured, and the quality stability of battery module products in the same batch is ensured.

With reference to FIG. 2 and FIG. 3, in some embodiments, shaft sleeves 51 are arranged on the fixing portion 5 and are provided with holes in the first direction; and guide shafts 325 are arranged on the pressing plate structures 32 and extend in the first direction, and the guide shafts 325 penetrate through the shaft sleeves 51; mounting structures 3251 are formed at tail ends of the guide shafts 325 deviating from the pressing plate structures 32; and the limiting portions 324 are arranged on the mounting structures 3251.

It is to be noted that the guide shafts 325 penetrate through the shaft sleeves 51, and the shaft sleeves 51 have an effect for guiding the guide shafts 325, that is, the guide shafts 325 can only move on the shaft sleeves 51 in the first direction; the guide shafts 325 are generally provided with two ends, one end is connected to the pressing plate structures 32, the other end serves as a tail end for the limiting portions 324 to be arranged, and the limiting portions 324 can be directly arranged on the guide shafts 325 or indirectly connected to the guide shafts 325 through other structures; and in this embodiment, the limiting portions 324 are indirectly mounted on the guide shafts 325 through the mounting structures 3251, but it is to be noted that it is needed to rigidly connect the limiting portions 324 to the guide shafts 325 so as to ensure rigid locking of the stroke of the pressing plate structures 32.

According to the above embodiment, the shaft sleeves 51 can play a role in guiding the guide shafts 325, namely, a role in guiding the pressing plate structures 32, thereby ensuring that the pressing plate structures 32 can accurately compress the battery module; moreover, according to the solution, the mounting structures 3251 on the guide shafts 325 are fully utilized as mounting foundations of the limiting portions 324, the structure is simple; and when the limiting portions 324 abut against the fixing portion 5, the resulted reverse acting force can directly act on the guide shafts 325 in an axial direction, thus the radial load of the guide shafts 325 acting on the shaft sleeves 51 is reduced, and the service lives of the guide shafts 325 and the shaft sleeves 51 are prolonged.

In some embodiments, the limiting portions 324 include limiting bolts which are connected to the pressing plate structures 32 by means of thread pairs; and in the screwing stroke of the limiting bolts, the positions of the limiting bolts in the first direction are adjustable.

It is to be noted that the thread pairs refer to internal threads and external threads which are meshed with each other; in this embodiment, the external threads are formed in the limiting bolts, internal bolts are formed in threaded holes in the pressing plate structures 32, and obviously, in order to make the positions of the limiting bolts in the first direction adjustable in the screwing stroke of the limiting bolts, the extending direction of the threaded holes in the pressing plate structures 32 is the first direction.

According to the above technical means, the characteristic that the limiting bolts can be adjusted in a stepless mode is utilized, so the moving stroke of the pressing plate structures can be accurately adjusted, adaptive adjustment can be performed according to the battery modules of different specifications, thus the application range of the device is widened, more accurate compressing force can be applied to the battery module, and the excellent rate of the battery module is increased.

In some embodiments, the limiting portions 324 include limiting bolts 324a.

It is to be noted that the position adjusting mode of the limiting bolts 324a is that the limiting bolts 324a extend in the first direction and are directly or indirectly in threaded connection with the pressing plate structures 32, and the positions of the limiting bolts 324a in the first direction can be adjusted by screwing the limiting bolts 324a forwards or reversely.

According to the above embodiment, the characteristic that the limiting bolts 324a can be adjusted in a stepless mode is utilized to accurately adjust the moving stroke of the pressing plate structures 32, and therefore more accurate compressing force can be applied to the battery module, and the excellent rate of the battery module is improved.

With reference to FIG. 2, in some embodiments, sensing portions 323 are arranged on the pressing plate structures 32; the module pressurization device 100 further includes two arriving detection apparatuses 6 which are arranged at an intervals in the first direction, and the two arriving detection apparatuses 6 are electrically connected to the control apparatus; and in the moving stroke of the pressing plate structures 32, the sensing portions 323 can sequentially reach the positions of the two arriving detection apparatuses 6, and the arriving detection apparatuses 6 are configured to identify the sensing portion 323 and feed back arriving signals to the control apparatus.

It is to be noted that the sensing portions 323 can serve as one part of the pressing plate structures 32 and can also serve as a split structure to be directly or indirectly installed on the pressing plate structures 32, the sensing parts 323 correspond to the positions of the arriving detection apparatuses 6; the sensing portions 323 can arrive at the positions of the arriving detection apparatuses 6 respectively within the moving stroke of the pressing plate structures 32, and therefore the arriving detection apparatuses 6 can identify the sensing portions 323 and feed back the arriving signals; and the positions of the two arriving detection apparatuses 6 correspond to the two ends of the stroke of the pressing plate structures 32 respectively, namely, the two detection apparatuses are configured to feed back signals of the pressing plate structure 32 at a retraction position and a pressurization position respectively, specifically, the two detection apparatuses can be photoelectric sensors, and the signals can be generated by shielding the photoelectric sensors with the sensing portions 323; and the two detection apparatuses can also be pressure sensors, which are in contact with the sensing portions 323 to generate the arriving signals.

According to the above embodiment, in the moving process of the pressing plate structures 32, the sensing portions 323 can move together, the two arriving detection apparatuses 6 serving as sensing elements are fixedly arranged and located at two ends of the stroke of the pressing plate structures 32 to sense the positions of the sensing portions 323, thus the positions of the pressing plate structures 32 can be reflected, furthermore, the current state of the pressing plate structures 32 can be fed back to a system, then the system can conveniently make corresponding control over the driving structures 31 to reduce ineffective energy consumption, for example, when one pressing plate structure 32 is located at the position in which the battery module can be compressed, the corresponding arriving detection apparatus 6 can feed back a downward pressing arriving signal, and then the control apparatus can control the corresponding driving structure 31 to stop driving.

With reference to FIG. 1 and FIG. 4, in some embodiments, a tray 200 configured to convey the battery module is arranged on the conveying line 1, the tray 200 includes a bottom end and a top end which are opposite in the first direction, and a plurality of avoiding channels 210 for communicating the bottom end with the top end, and the battery module can be replaced on the top end; and when the tray is located at the pressurization station, the jacking and supporting portions can jack and support the battery module through the corresponding avoiding channels 210 within the moving stroke.

It is to be noted that when the positions of the plurality of avoiding channels 210 on the tray 200 are to be set as that when the tray 200 is located at the pressurization station, each avoiding channel 210 corresponds to one corresponding jacking and supporting portion 21; and the tray 200 can be specifically of a frame structure or a plate-shaped structure, which is not limited in this embodiment of the present application.

According to the above technical means, the battery module is loaded by the tray 200 to be transferred on the conveying line 1, so that the battery module is prevented from being collided and damaged due to direct contact with the conveying line 1; and when the tray 200 loading the battery module is conveyed to the pressurization station, the jacking and supporting portions 21 can make contact with the battery module located at the top end of the tray 200 by the avoiding channels 210 in the tray 200, and therefore the battery module can be jacked and supported so as to be smoothly separated from the tray 200, and the tray 200 and the conveying line 1 are prevented from being pressed.

Further, in some embodiments, the module pressurization device 100 further includes a tray positioning apparatus 8 arranged corresponding to the pressurization station, and the tray positioning apparatus 8 is configured to position the tray 200.

It is to be noted that the tray positioning apparatus 8 is configured to correspond to the position of the pressurization mechanism 3 so as to position the incoming tray 200 at the pressurization station, the tray 200 has the function of positioning the battery module, namely, the battery module that is accurately placed on the tray 200 can be positioned at the position corresponding to the pressurization mechanism 3 by the tray positioning device 8; the tray positioning device 8 is of a plurality of structures, and can perform positioning by a positioning block or a positioning pin; the positioning block or the positioning pin is generally driven by the cylinders, and can also be driven by a servo motor; and the positioning direction is generally in the first direction, which is not listed herein in this embodiment.

According to the above embodiment, when the tray 200 loading the battery module is conveyed to the pressurization station, the tray 200 can be positioned by the tray positioning apparatus 8, so that the tray 200 is kept at the position corresponding to the pressurization mechanism 3, namely, the battery module is ensured to be located at the position corresponding to the pressurization mechanism 3, and thus the pressurization mechanism 3 can accurately pressurize the battery module.

In some embodiments, a movable blocking structure 7 is further arranged on the conveying line 1, and the movable blocking structure 7 can block the battery module at the pressurization station.

It is to be noted that the movable blocking structure 7 serving as a common structure on the conveying line 1 can be movably arranged and generally has two positions, namely an extending position for extending out of the conveying line 1 and a retracting position for retracting back to the conveying line 1; when at the extending position, the movable blocking structure 7 can block the battery module from advancing; when at the retracting position, the movable blocking structure 7 can allow the battery module to pass through; and there are various specific mechanisms, which are not limited in this embodiment.

According to the above embodiment, the movable blocking structure 7 can move on the conveying line 1 so as to have the two positions for extending out of the conveying line 1 and retracting back to the conveying line 1 respectively; and when extending out of the conveying line 1, the movable blocking structure 7 can play a role in blocking the battery module at the pressurization station, which facilitates subsequent pressurization, and improving the production efficiency.

With reference to FIG. 1, in some embodiments, the module pressurization device 100 further includes an anti-deviation detection apparatus 9 which is configured to detect the position of the battery module after the jacking and supporting mechanism 2 acts so as to generate a corresponding detection signal; and the control apparatus is electrically connected to the anti-deviation detection apparatus 9 so as to control the pressurization mechanism 3 to act when the detection signal is the normal signal.

It is to be noted that the anti-deviation detection apparatus 9 is configured to detect whether the position of the battery module deviates or not; if the tray 200 is adopted to load the battery module, whether the placement position of the battery module on the tray 200 is accurate or not is reflected by the anti-deviation detection apparatus 9; the specific detection mode can be that the anti-deviation detection apparatus 9 is an infrared sensor, and the identifying range of the infrared sensor is greatly related to a position that the battery module would appear, that is, when the battery module deviates, the battery module can enter the identifying range of the infrared sensor so as to be detected by the infrared sensor; and the anti-deviation detection apparatus 9 can also be a visual camera, and is configured to identify the position of the battery module in a photographing identifying mode, and its specific structure is not limited in this embodiment.

Figure 5:
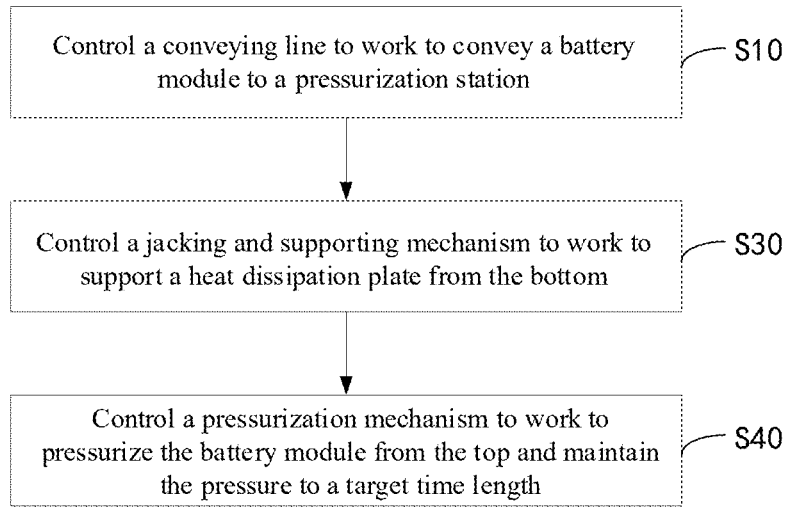
FIG. 5 is a flowchart of an Embodiment 1 of a pressurization method provided by the present application.

According to the above embodiment, the anti-deviation detection apparatus 9 can detect the position of the battery module after the jacking and supporting mechanism 2 acts; only the detection signal fed back after the position of the battery module is ensured to be accurate is the normal signal, the control apparatus can control the pressurization mechanism 3 to follow up the action so as to complete pressurization; when the position of the battery module deviates, and the detection signal fed back by the anti-deviation detection apparatus 9 is an abnormal signal, the control apparatus will control the pressurization mechanism 3 to stop acting, and meanwhile warns an operator to adjust the battery module in time, or control other adjusting mechanisms to adjust the battery module until the position of the battery module is recovered to be accurate, and therefore the production loss caused by a fact that the battery module is not in place can be avoided. The present application provides a pressurization method for a module pressurization device 100; with reference to FIG. 5, FIG. 5 is a flowchart of an Embodiment 1 of a pressurization method provided by the present application, the module pressurization device 100 is provided with a pressurization station for carrying out pressure maintaining on a battery module of which the bottom is adhered with a heat dissipation plate; the module pressurization device 100 includes a jacking and supporting mechanism 2, a pressurization mechanism 3 and a conveying line 1;

the pressurization method includes:
S10: a step of entering station: controlling the conveying line 1 to work to convey the battery module to the pressurization station;
in which, a mounting station of the heat dissipation plate is generally at the upstream of the pressurization station, and the battery module can be automatically conveyed to the pressurization station through the conveying line 1, so that the automatic transferring of the battery module is realized.
S30: a step of jacking: controlling the jacking and supporting mechanism 2 to work to support the heat dissipation plate from the bottom; and
in which, the jacking and supporting mechanism 2 is controlled to work to jack the battery module arriving at the pressurization station to be separated from the conveying line 1, and the jacking and supporting mechanism 2 can stably bear the battery module with relatively large weight.
S40: a step of maintaining pressure: controlling the pressurization mechanism 3 to work to pressurize the battery module from the top and maintaining the pressure to a target time length.

The pressurization mechanism 3 is controlled to work to release the pressure of the battery module from the top so as to be matched with the jacking and supporting mechanism 2 to clamp the heat dissipation plate and the battery module, and thus heat-conducting glue coated between the heat dissipation plate and the battery module can be extruded and spread.

In the technical solution of this embodiment of the present application, due to the automatic conveying by the conveying line 1, the battery module transferring efficiency can be improved, and the production efficiency of a battery pack production line is improved; then the battery module can be jacked and supported to be separated from the conveying line 1 by means of the jacking and supporting mechanism 2, so that the conveying line 1 is prevented from bearing the pressurization force; and under the cooperation of the pressurization mechanism 3, heat-conducting glue between the battery module and the heat dissipation plate can be fully extruded and uniformly spread, thus the heat-conducting glue coats each local position on a heating surface of the battery module, and the heat dissipation efficiency of the battery module is improved.

Figure 6:
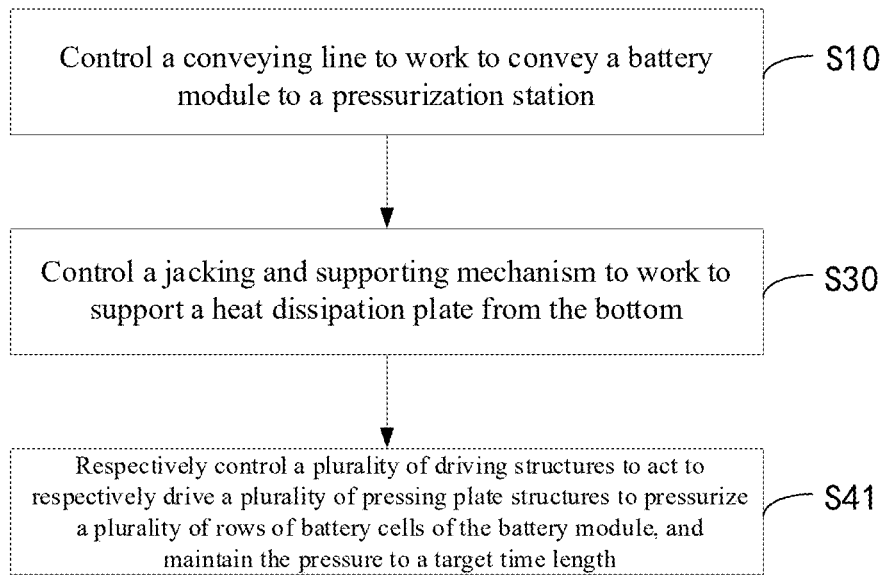
FIG. 6 is a flowchart of an Embodiment 2 of a pressurization method provided by the present application.

With reference to FIG. 6, FIG. 6 is a flowchart of an Embodiment 2 of a pressurization method provided by the present application; in some embodiments, the pressurization mechanism 3 includes a plurality of pressurization assemblies 3*a*, and each pressurization assembly 3*a* includes a driving structure 31 and a pressing plate structure 32; and the step of maintaining pressure includes:
S41: respectively controlling a plurality of driving structures 31 to act to respectively drive a plurality of pressing plate structures 32 to pressurize a plurality of rows of battery cells of the battery module, and maintaining the pressure to the target time length.

According to the above embodiment, the plurality of driving structures 31 can be driven and controlled respectively, so that local pressurization force is controllable, pressure on each position of the battery module is uniform, that is, it is ensured that each position of the heat-conducting glue between the battery module and the heat dissipation plate is uniformly pressed, and moreover, the pressure is maintained to the target time length to prevent the heat-conducting glue from retracting, the heat-conducting glue can be kept in a state of being in close contact with the heat dissipation plate and the battery module, and therefore, the heat dissipation efficiency of the battery module is improved.

Figure 7:
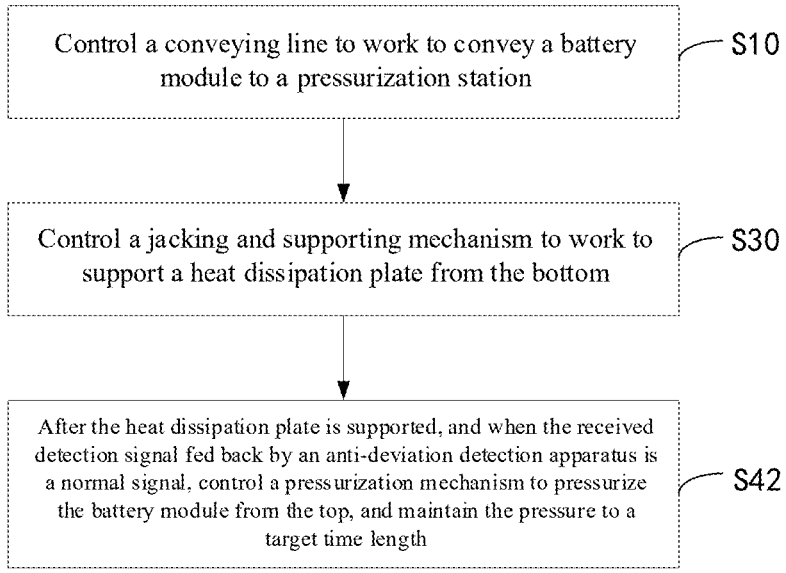
FIG. 7 is a flowchart of an Embodiment 3 of a pressurization method provided by the present application.

With reference to FIG. 7, FIG. 7 is a flowchart of an Embodiment 2 of a pressurization method provided by the present application; in some embodiments, the module pressurization device 100 further includes an anti-deviation detection apparatus 9 configured to detect the position of the battery module after the jacking and supporting mechanism 2 acts and feed back a corresponding detection signal to the control apparatus; and the step of maintaining pressure includes:
S42: after the heat dissipation plate is supported, and when the received detection signal fed back by the anti-deviation detection apparatus 9 is a normal signal, controlling the pressurization mechanism 3 to pressurize the battery module from the top, and maintaining the pressure to the target time length.

After being conveyed to the pressurization station by the conveying line 1, the battery module is needed to be jacked and supported by the jacking and supporting mechanism 2 so as to be separated from the conveying line 1, so that the problem that the position of the battery module is changed may occur in the jacking and supporting process, or the battery module has position deviation on the conveying line 1 originally, and if the position change or the position deviation is not detected and adjusted and compensated in time, the pressurizing of the pressurization mechanism 3 will be influenced undoubtedly.

According to the above technical means, the anti-deviation detection apparatus 9 is arranged to sense the position state of the battery module, so that when the battery module is located at an accurate position, and the detection signal fed back by the anti-deviation detection apparatus 9 is the normal signal, the control apparatus can control the pressurization mechanism 3 to accurately pressurize the battery module, thus ensuring the pressurization quality; and when the battery module is located at an inaccurate position, and the detection signal fed back by the anti-deviation detection apparatus 9 is an abnormal model, the control apparatus can control the pressurization mechanism 3 to stop downward pressing, so that an operator can adjust the position of the battery module or other adjusting devices can be used for adjusting the position of the battery module to ensure the pressurization quality.

Figure 8:
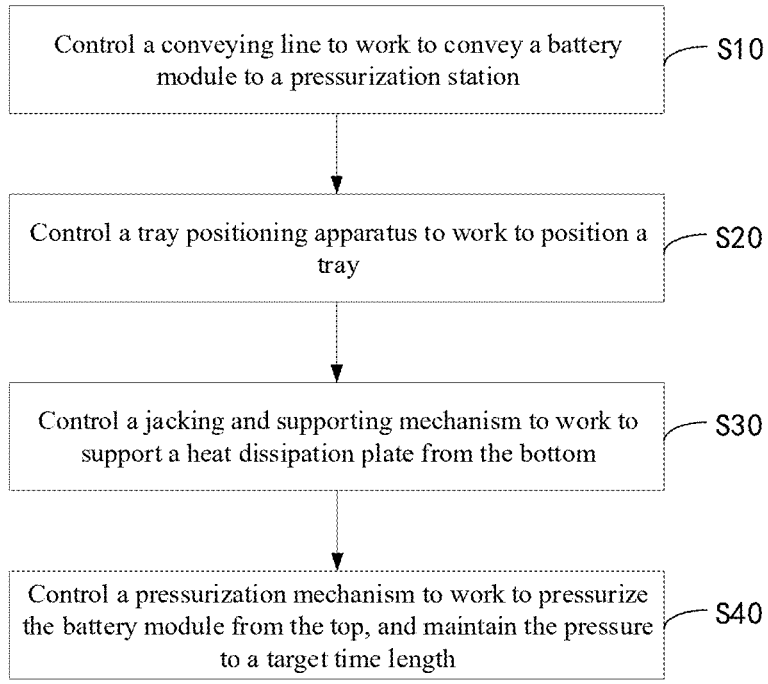
FIG. 8 is a flowchart of an Embodiment 4 of a pressurization method provided by the present application.

With reference to FIG. 8, FIG. 8 is a flowchart of an Embodiment 4 of a pressurization method provided by the present application; in some embodiments, the conveying line 1 is configured to convey the battery module by a tray 200, and the module pressurization device 100 further includes a tray positioning apparatus 8; and after the step of entering station, the pressurization method further includes:
S20: a step of positioning: controlling the tray positioning apparatus 8 to work to position the tray 200.

The pressurizing precision of the pressurization mechanism 3 on the battery module is relatively high; when the position of the battery module at the pressurization station has relatively large deviation, the problem of incomplete pressurizing may be caused, namely the problem that part of the heat dissipation plate is not pressed is caused; because the movement of the battery module on the conveying line 1 is not directly carried out, it is also needed to load the battery module by the tray 200; and on the premise that the placement is accurate, the relative position of the battery module and the tray 200 is fixed, and thus the position of the battery module can be fixed by fixing the position of the tray 200.

According to the above embodiment, an incoming tray 200 is positioned at the pressurization station by the tray positioning apparatus 8, thus the battery module can be accurately positioned at the pressurization station to be accurately aligned with the pressurization mechanism 3, the pressurization precision is ensured, and the excellent rate of products is improved.

Figure 9:
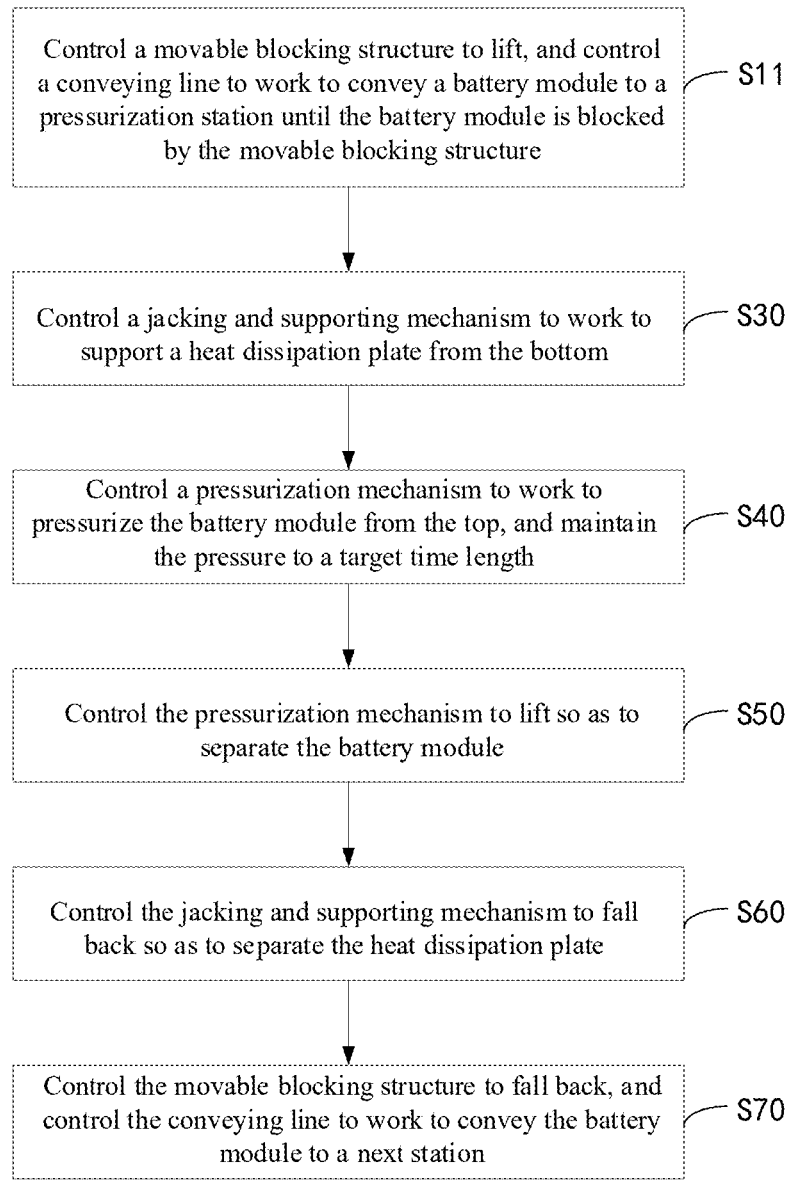
FIG. 9 is a flowchart of an Embodiment 5 of a pressurization method provided by the present application.

With reference to FIG. 9, FIG. 9 is a flowchart of an Embodiment 5 of a pressurization method provided by the present application; and some embodiments, after the step of maintaining pressure, the pressurization method further includes:
S50: a step of releasing pressure: controlling the pressurization mechanism 3 to lift so as to separate the battery module; and
S60: a step of falling back: controlling the jacking and supporting mechanism 2 to fall back so as to separate heat dissipation plate.

In a production line, incoming materials are continuously supplied to ensure uninterrupted production of products, so that the motion of the devices in the production line is usually reciprocating motion, and the devices return to the initial positions to wait for processing the next incoming material after one incoming material is processed.

According to the above embodiment, after the step of maintaining pressure, the pressurization and pressure maintaining operations on the battery module and the heat dissipation plate are completed; at the moment, by the step of releasing pressure, the pressurization mechanism 3 can be returned to an initial position so as to separate the battery module; moreover, by the step of falling back, the jacking and supporting mechanism 2 can be returned to the initial position so as to separate the heat dissipation plate; at the moment, the battery module can be returned to the conveying line 1 again, and the battery module can be conveyed to a next station by the conveying line 1; and after that, the module pressurization device 100 can be recovered to an idle state again, and the conveying line 1 can convey a next battery module to the pressurization station in time, thus uninterrupted pressurization operation by the module pressurization device 100 on the battery module is realized, and the production efficiency is guaranteed.

With reference to FIG. 9, in some embodiments, a movable blocking structure 7 is further arranged on the conveying line 1 of the module pressurization device 100;

the step of entering station includes:

S11: controlling the movable blocking structure 7 to lift, and controlling the conveying line 1 to work to convey the battery module to the pressurization station until the battery module is blocked by the movable blocking structure 7; and in which, two actions of controlling the movable blocking structure 7 to lift and controlling the conveying work can be simultaneously performed, or separately performed as long as the battery module can be timely blocked by the movable blocking structure 7 after being conveyed to the pressurization station by the conveying line 1; on the conveying line 1, there are various types of movable blocking structure 7, which is not limited in this embodiment; and the movable blocking structure 7 can directly block the battery module, and or indirectly block the battery module by the battery module loaded by the tray 200.

Correspondingly, after the step of falling back, the pressurization method further includes a step of exiting station, which includes:

S70: controlling the movable blocking structure 7 to fall back, and controlling the conveying line 1 to work to convey the battery module to a next station.

Similarly, two actions of controlling the movable blocking structure 7 to fall back and controlling the conveying line 1 to work can be simultaneously performed, or separately performed successively as long as the battery module can be timely conveyed to the next station by the conveying line 1 after being pressurized, which is not limited in this embodiment.

According to the above embodiment, the movable blocking structure 7 is arranged on the conveying line 1 and can extend out of and retract back to the conveying line 1 within the moving stroke of the conveying line 1, so as to block the battery module at the pressurization station, thus the battery module can be preliminarily positioned, which facilitates the pressurization apparatus to follow up to pressurization and pressure maintaining operations on the battery module; and moreover, the pressurized battery module can be released in time, so that the pressurization efficiency of the module pressurization device 100 is improved.

Figure 10:
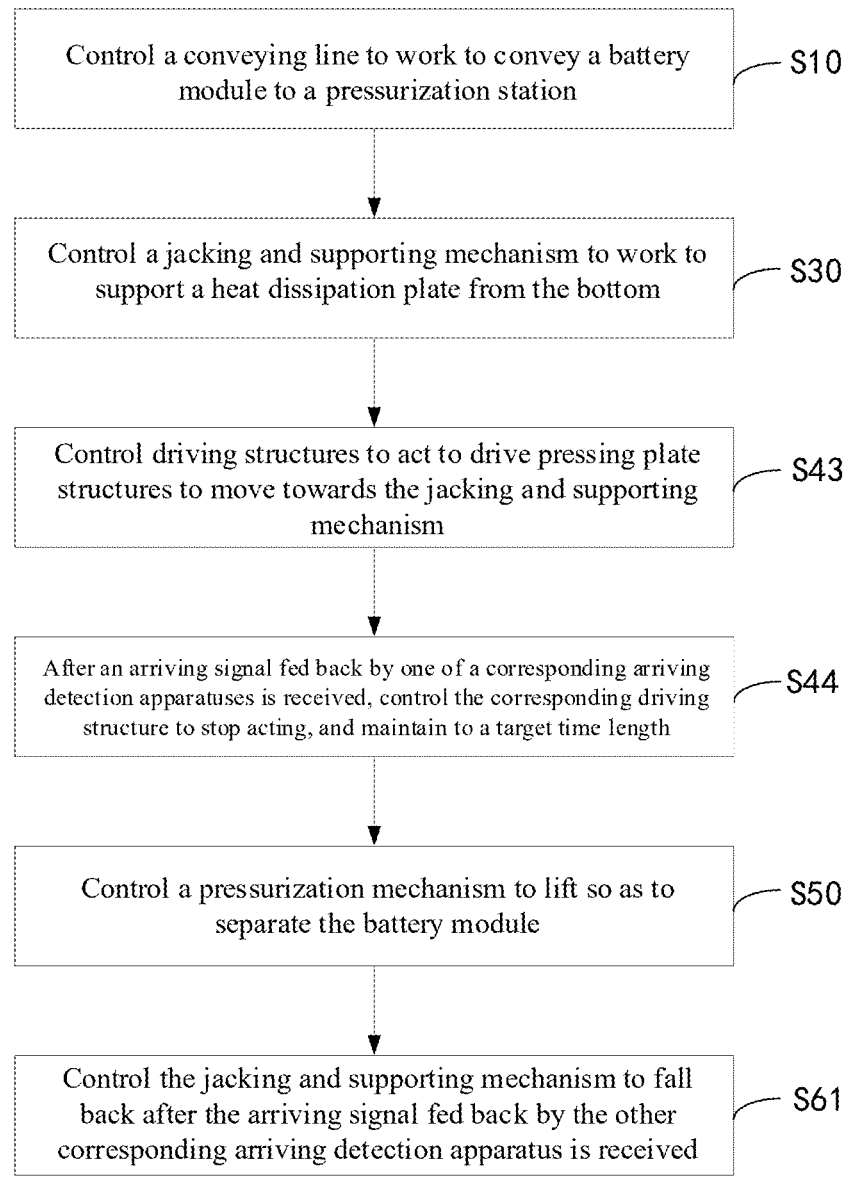
FIG. 10 is a flowchart of an Embodiment 6 of a pressurization method provided by the present application.

With reference to FIG. 10, FIG. 10 is a flowchart of an Embodiment 6 of a pressurization method provided by the present application; in some embodiments, the pressurization mechanism 3 includes driving structures 31 and pressing plate structures 32, the module pressurization device 100 further includes two arriving detection apparatuses 6, and the two arriving detection apparatuses 6 are configured to fed back arriving signals of the pressing plate structures 32 at the corresponding positions respectively;

the step of maintaining pressure includes:

S43: controlling the driving structures 31 to act to drive the pressing plate structures 32 to move towards the jacking and supporting mechanism 2; and S44: after the arriving signal fed back by one of the corresponding arriving detection apparatuses 6 is received, controlling the corresponding driving structure 31 to stop acting, and maintaining to the target time length; and correspondingly, the step of falling back includes:

S61: controlling the jacking and supporting mechanism 2 to fall back after the arriving signal fed back by the other corresponding arriving detection apparatus 6 is received.

Generally, it is needed to feed back the driving position state of the driving structures 31 to the control system, and thus the control system can perform timely feedback control on the driving structures 31 so as to control the driving stroke of the driving structures 31.

According to the above embodiment, in the moving process of the pressing plate structures 32, the position state of the pressing plate structures 32 can be detected by means of the two arriving detection apparatuses 6, and then the current state of the pressing plate structures 32 is fed back to the control apparatus; in the process that the pressing plate structures 32 move towards the jacking and supporting mechanism 2, if the compressing is performed to reach the position of the battery module, the corresponding arriving detection apparatus 6 can detect the position state in time, and the control apparatus will control the corresponding driving structure 31 to stop working in time, so that the battery module can be prevented from being excessively compressed from the source, and invalid energy consumption of the driving structures 31 can be reduced; and if the corresponding arriving detection apparatus 6 is triggered in the process that the corresponding pressing plate structure 32 is lifted away from the jacking and supporting mechanism 2, the pressurization mechanism 3 returns to the initial position, then the jacking and supporting mechanism 2 can be controlled to fall back in a following mode, thus initialization of the module pressurization device 100 is achieved, and pressurization operation can be conveniently carried out on the next battery module.

Finally, it is to be noted that the above embodiments are only used for illustrating the technical solutions of the present application, not to limit them, and although the present application is described in detail with reference to the foregoing embodiments, those of ordinary skill in the art should understand that it may still modify the technical solutions described in the foregoing embodiments, or replace some or all of the technical features therein, and these modifications or substitutions do not make the essence of the corresponding technical solutions out of the scope of the technical solutions of the embodiments of the present application, and they should be covered by the scope of the claims and description of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A module pressurization device, being provided with a pressurization station for carrying out pressure maintaining on a battery module of which the bottom is adhered with a heat dissipation plate, the module pressurization device comprising:

a conveying line which passes through the pressurization station and is configured to convey the battery module;

a pressurization apparatus arranged corresponding to the pressurization station, the pressurization apparatus comprising a jacking and supporting mechanism and a pressurization mechanism which are opposite one another in a first direction, wherein the jacking and supporting mechanism is provided with a plurality of jacking and supporting portions which can move in the first direction, the plurality of jacking and supporting portions are arranged in a second direction and are configured to jack and support the heat dissipation plate so as to separate the battery module from the conveying line, and the pressurization mechanism is configured to compress the battery module; and a control apparatus which is electrically connected to the jacking and supporting mechanism and the pressurization mechanism so as to control the jacking and supporting mechanism and the pressurization mechanism to act, wherein the second direction is perpendicular to the first direction.

2. The module pressurization device according to claim 1, wherein:

the pressurization mechanism comprises a plurality of pressurization assemblies, and each pressurization assembly is arranged corresponding to at least one row of battery cells of the battery module and comprises:
a driving structure which is provided with a driving portion that can move in the first direction; and
a pressing plate structure which is arranged on the driving portion and configured to compress to reach the at least one row of battery cells when the driving portion moves towards the jacking and supporting mechanism; and
the control apparatus is electrically connected to a plurality of driving structures.

3. The module pressurization device according to claim 2, wherein in a moving stroke of the driving portions, the pressing plate structures can perform compressing to reach two rows of battery cell modules in the battery module.

4. The module pressurization device according to claim 2, wherein:

the driving structures comprise a plurality of cylinders which are arranged in a length direction of the pressing plate structures, and piston rods of the cylinders are connected to the pressing plate structures; and
the driving portions comprise the piston rods.

5. The module pressurization device according to claim 2, wherein the pressing plate structures comprise insulated pressing plates, and the insulated pressing plates are configured to compress the battery cells.

6. The module pressurization device according to claim 5, wherein the pressing plate structures further comprise connecting plates which are arranged on the driving portions, and the insulated pressing plates are detachably arranged on the connecting plates.

7. The module pressurization device according to claim 5, wherein a plurality of compressing protrusions are formed on the insulated pressing plates and configured to perform compressing to reach a plurality of terminal posts of the at least one row of battery cells.

8. The module pressurization device according to claim 2, further comprising:

a fool-proof structure, comprising:
two matching portions, one being arranged on the pressing plate structures while the other one being fixed relative to a position of the pressurization station, wherein the two matching portions can be oppositely arranged within a moving stroke of the pressing plate structures away from the jacking and supporting mechanism; and
a connecting portion which is configured to connect the two matching portions when the two matching portions are oppositely arranged so as to limit the pressing plate structures to move towards the jacking and supporting mechanism.

9. The module pressurization device according to claim 8, wherein the fool-proof structure further comprises:

a placement portion which is fixed relative to the position of the pressurization station, the connecting portion also being able to be selectively placed on the placement portion; and
an in-place detection apparatus which is arranged corresponding to the placement portion and is electrically connected to the control apparatus to generate a warning signal after the connecting portion is detected.

10. The module pressurization device according to claim 2, further comprising:

a fixing portion, fixed relative to a position of the pressurization station; and
limiting portions arranged on the pressing plate structures and opposite to the fixing portion in the first direction, wherein the limiting portions are configured to prop against the fixing portion when the pressing plate structures move to a position in which the at least one row of battery cells are to be compressed.

11. The module pressurization device according to claim 10, wherein:

shaft sleeves are arranged on the fixing portion and are provided with holes in the first direction;
guide shafts are arranged on the pressing plate structures and extend in the first direction, and the guide shafts penetrate through the shaft sleeves; and
mounting structures are formed at tail ends of the guide shafts deviating from the pressing plate structures; and
the limiting portions are arranged on the mounting structures.

12. The module pressurization device according to claim 10, wherein:

the limiting portions comprise limiting bolts which are connected to the pressing plate structures by means of thread pairs; and
in a screwing stroke of the limiting bolts, positions of the limiting bolts in the first direction are adjustable.

13. The module pressurization device according to claim 2, further comprising:

two arriving detection apparatuses arranged at an intervals in the first direction and electrically connected to the control apparatus;
wherein the pressing plate structures are further provided with sensing portions configured to sequentially arrive at the positions of the two arriving detection apparatuses in the moving stroke of the pressing plate structures, and the arriving detection apparatuses are configured to identify the sensing portions and feed back arriving signals to the control apparatus.

14. The module pressurization device according to claim 1, wherein a tray configured to convey the battery module is arranged on the conveying line, the tray comprises a bottom end and a top end which are opposite in the first direction, and a plurality of avoiding channels for communicating the bottom end with the top end, and the battery module can be replaced on the top end; and when the tray is located at the pressurization station, the jacking and supporting portions can jack and support the battery module through the corresponding avoiding channels within the moving stroke.

15. The module pressurization device according to claim 14, further comprising a tray positioning apparatus arranged corresponding to the pressurization station, wherein the tray positioning apparatus is configured to position the tray.

16. The module pressurization device according to claim 1, wherein a movable blocking structure is further arranged on the conveying line, and the movable blocking structure is configured to block the battery module at the pressurization station.

17. The module pressurization device according to claim 1, further comprising:
an anti-deviation detection apparatus configured to detect the position of the battery module after the jacking and supporting mechanism acts so as to generate a corresponding detection signal;
wherein the control apparatus is electrically connected to the anti-deviation detection apparatus so as to control the pressurization mechanism to act when the detection signal is a normal signal.

18. A pressurization method for a module pressurization device, the module pressurization device being provided with a pressurization station for carrying out pressure maintaining on a battery module of which the bottom is adhered with a heat dissipation plate, the module pressurization device comprising:
a conveying line which passes through the pressurization station and is configured to convey the battery module and a pressurization apparatus arranged corresponding to the pressurization station, the pressurization apparatus comprising a jacking and supporting mechanism and a pressurization mechanism which are opposite one another in a first direction, wherein the jacking and supporting mechanism is provided with a plurality of jacking and supporting portions which can move in the first direction, the plurality of jacking and supporting portions are arranged in a second direction and are configured to jack and support the heat dissipation plate so as to separate the battery module from the conveying line, and the pressurization mechanism is configured to compress the battery module, and a control apparatus which is electrically connected to the jacking and supporting mechanism and the pressurization mechanism so as to control the jacking and supporting mechanism and the pressurization mechanism to act, wherein the second direction is perpendicular to the first direction,
the pressurization method comprising:
entering station: controlling the conveying line to work to convey the battery module to the pressurization station;
jacking: controlling the jacking and supporting mechanism to work to support the heat dissipation plate from the bottom; and
maintaining pressure: controlling the pressurization mechanism to work to pressurize the battery module from the top and maintaining the pressure to a target time length.

19. The pressurization method according to claim 18, wherein:
the pressurization mechanism comprises a plurality of pressurization assemblies, and each pressurization assembly comprises a driving structure and a pressing plate structure; and
maintaining pressure comprises:
respectively controlling a plurality of driving structures to act to respectively drive the plurality of pressing plate structures to pressurize a plurality of rows of battery cells of the battery module, and maintaining the pressure to the target time length.

20. The pressurization method according to claim 18, wherein:
the module pressurization device further comprises an anti-deviation detection apparatus configured to detect the position of the battery module after the jacking and supporting mechanism acts and feed back a corresponding detection signal to the control apparatus; and
maintaining pressure comprises:
after the heat dissipation plate is supported, and when the received detection signal fed back by the anti-deviation detection apparatus is a normal signal, controlling the pressurization mechanism to pressurize the battery module from the top, and maintaining the pressure to the target time length.

* * * * *